United States Patent [19]

Puvogel

[11] Patent Number: 4,733,389
[45] Date of Patent: Mar. 22, 1988

[54] DROP CABLE FOR A LOCAL AREA NETWORK

[75] Inventor: John M. Puvogel, Lawndale, Calif.

[73] Assignee: Xerox Corporation, Stamford, Conn.

[21] Appl. No.: 890,210

[22] Filed: Jul. 28, 1986

[51] Int. Cl.⁴ .............................................. H04J 15/00
[52] U.S. Cl. ...................................................... 370/5
[58] Field of Search ................................ 370/5, 85, 89

[56] References Cited

U.S. PATENT DOCUMENTS 1,374,221  4/1921  Osborne .................................. 370/5
4,583,214  4/1986  Miyashita et al. ..................... 370/5

FOREIGN PATENT DOCUMENTS 0198932  10/1986  European Pat. Off. ................. 370/5

Primary Examiner—Douglas W. Olms
Attorney, Agent, or Firm—Franklyn C. Weiss

[57] ABSTRACT

A multipoint data communication system is disclosed for transmitting data to and from a plurality of communicating devices via an interconnecting cable. This interconnecting drop cable couples a transceiver unit to a communicating device, such as a personal computer, workstation, printer, or the like. The drop cable herein has only two twisted, jointly shielded, pairs of wires to transmit the three signals (transmit, receive, collision) and power. AC differences in the pairs constitute the third, phantom, signal channel. DC differences in the pairs provide the power source for transceiver operations. This cable is considerably less expensive than the industry standard cable.

2 Claims, 6 Drawing Figures

PROPOSED AND DEMONSTRATED
ETHERNET DROP CABLE CONCEPT

PROPOSED AND DEMONSTRATED
ETHERNET DROP CABLE CONCEPT

DROP CABLE FOR A LOCAL AREA NETWORK

This invention relates to a drop cable which connects a user host station, i.e., terminal, printer, workstation, etc., to a transceiver module attached to an Ethernet ® coaxial cable. The drop cable allows transfer of three signals and power with two twisted pairs.

BACKGROUND OF THE INVENTION

U.S. Pat. No. 4,063,220, which issued Dec. 13, 1977, entitled "Multipoint Data Communication System With Collision Detection", discloses a bit serial receiver transceiver network continuously connected to a plurality of communicating devices. Such is accomplished by forming the network of any one of a plurality of transmitting media, such as coaxial cable, optical fiber or other, connected together into one branched network by constantly active devices, like repeaters, by which communications necessarily adapted to one medium are translated into another medium. The patent further goes on to state that distributed along the communicating cable network are a plurality of stations, each including a using device generally categorized as either a computer, an auxiliary memory, or an input-/output terminal. Each using host device, whether it be a computer or a remote terminal, is tied to the coaxial cable by way of a T-connector, or tap, connecting to a transceiver in series with an interface stage which in turn connects to the using device.

Three signals (transmit, receive, and collision) and power are transferred through the cable which connects the host equipment with the transceiver module. Host generated transmit signals are transferred to the transceiver. Transceiver generated receive and collision signals are transferred to the host equipment. Power for energizing the transceiver circuitry is transferred from the host source.

The system described is generally now publicly known as an Ethernet connection which, as set forth above, employs a drop cable between the transceiver module and the user host equipment. The transceiver module is attached to the Ethernet coaxial cable. User host equipment is a terminal, personal computer, workstation, printer, file server, gateway, etc.

IEEE specification 802.3 contains an industry accepted definition of the drop cable. Attention is drawn to FIG. 1 of the present application. This cable has five twisted pairs, with individual pair shields and an overall shield. One pair is used for each of the three signals and another for power. The fifth pair is user defined. Each twisted pair has a characteristic impedance of 78 ohms. Cable connections are through 15 pin sub-miniature "D" connectors, male to host and female to transceiver. Each pair shield has a specific pin assignment. The overall shield is connected through the conductive connector housing.

Transmit and receive signals are Manchester encoded data at a 10 megabit per second data rate. Transmit and receive waveforms have fundamental frequencies of 10 Mhz with continuous "1" or "0" data patterns or 5 Mhz with alternate "1"/"0" data patterns. A collision signal is a burst of 10 Mhz square wave. All three signals are essentially switching waveforms with controlled rise and fall times. Power is from an 11.4 to 15.75 volt DC supply within the host station.

According to the present invention, the proposed cable herein has only two twisted, jointly shielded pairs to convey the three signals (transmit, receive, and collision) and power. AC differences in the pairs constitute the third signal channel. DC difference in the pairs provides the power source for transceiver operation. Using standard 9 pin subminiature "D" connectors and lower cost cable, the cable assembly is less expensive than the IEEE standard drop cable.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
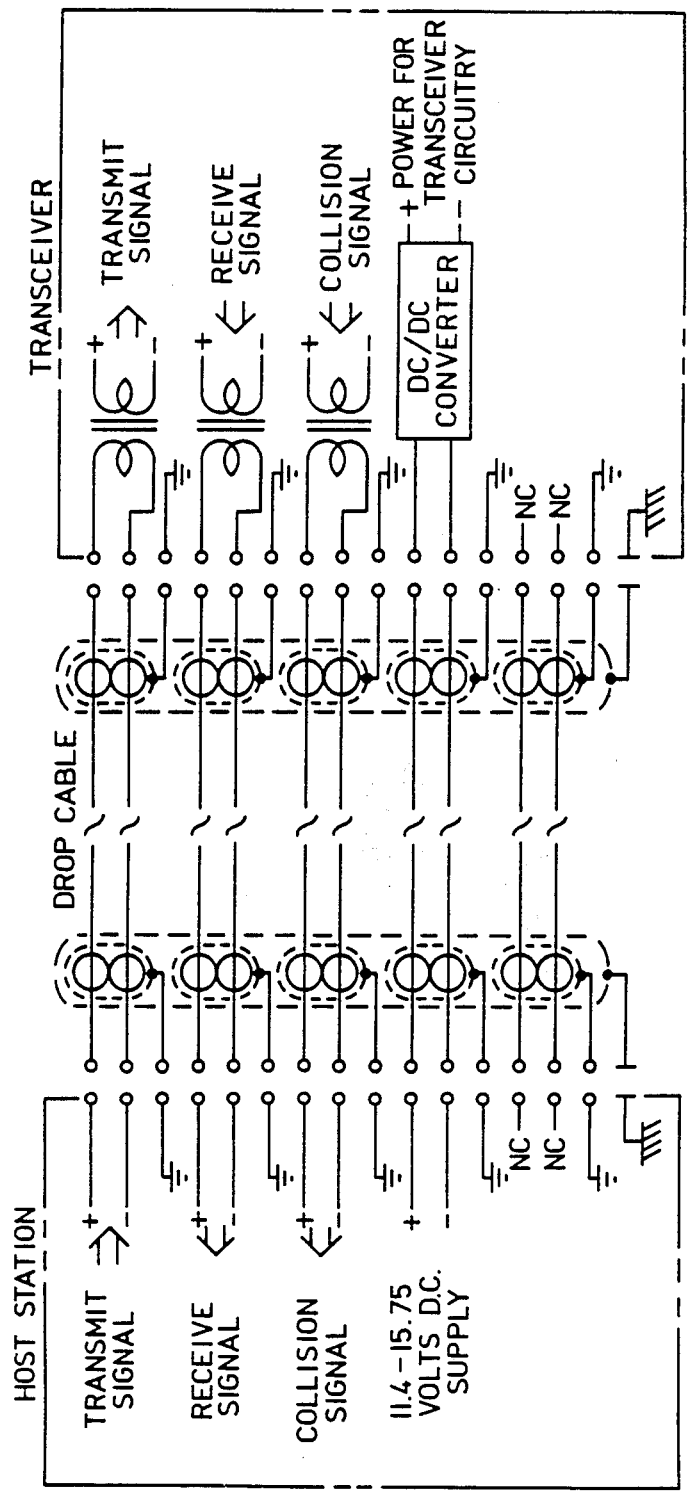
FIG. 1 is a prior art schematic diagram of the Ethernet drop cable defined by IEEE specification 802.3.
Figure 2:
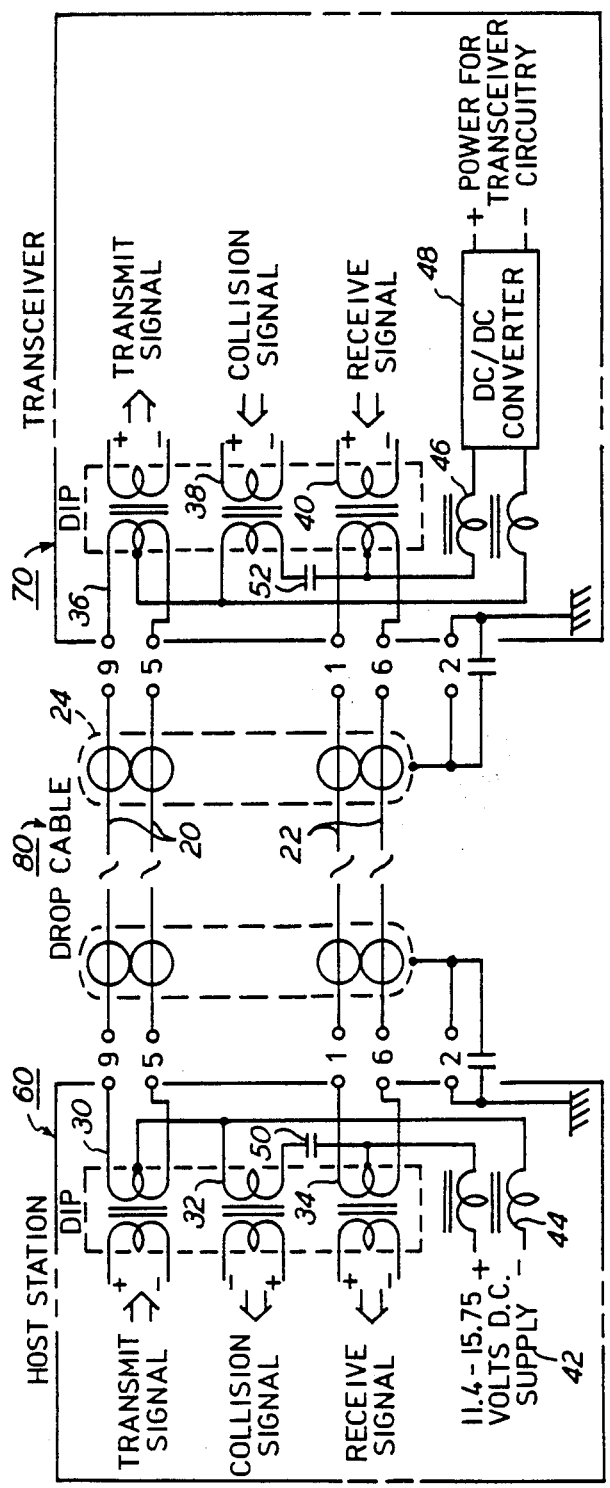
FIG. 2 is a schematic diagram of the Ethernet drop cable in conjunction with the present invention.

FIG. 2 shows the Ethernet drop cable in accordance with the principles of the present invention. The invention utilizes just four wires, i.e., two twisted pairs 20, 22 and an overall shield 24, as seen in FIG. 2. Three signal paths are provided by the technique commonly referred to as a phantom circuit. "Phantom circuits" may be best described by the textbook "Communication Engineering", by W. L. Everitt and W. E. Anner, McGraw-Hill, Third Edition, 1956, Section 5-13, Page 204. By the principle of superposition, the signals may be considered one at a time. Transmit and receive signals are transferred over the standard two wires, or physical circuits. Their operation is similar to that of IEEE standard 802.3. Both collision and power are transferred over the phantom circuit. Separation of the 10 Mhz collision signal and power is accomplished with capacitors and inductors as pass and reject filter elements.

The "phantom" circuit principle works on a balancing technique similar to that of a bridge circuit. The terminal equipment required is very simple, consisting only of a pair of transformers at each end of the phantom circuit. By the principle of superposition, the signals may be considered one at a time. A voltage impressed on the phantom circuit at the right end of FIG. 2, will cause a current to enter the mid-tap of the winding of each transformer. Thus, a collision signal introduced into the center tap of transformer 36 will cause a like signal to be generated at the center tap of transformer 30. Likewise, the voltage signals introduced at the center tap of transformer 40 will cause a like signal to be generated at the center tap of transformer 34.

If the impedances of the line wires are equal, the current will divide equally and produce inductances which cancel each other out. The currents due to the signals impressed on the phantom terminals produce equal and opposing inductances at the other end of the cable in the respective transformers so that no magnetic flux is produced.

Thus the absence of magnetic flux, due to the currents resulting from the phantom signals, prevents these signals from being further propogated. Thus, three discrete signal paths are provided with only two pair of wires. The wires are "twisted" to prevent the currents flowing in one pair of wires in a cable from inducting a voltage in another pair.

Since all the host stations on an Ethernet system receive all the transmitted signals, as described in the aforementioned patent, a collison signal must be detected and presented to the host user when any two stations attempt simultaneous transmission.

In order to eliminate having to run electrical power to the transceiver module, which is often placed in the drop ceiling of modern office buildings, a voltage supply in the host station provides that power.

Figure 3A:
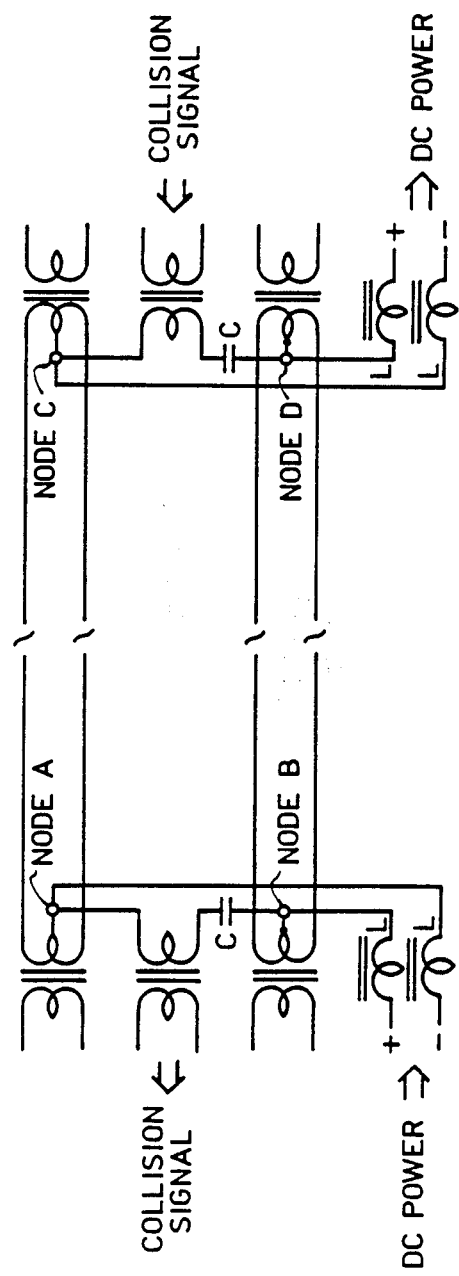
FIGS. 3A and 3B are schematic diagrams of the phantom circuit elements and phantom circuit equivalent.
Figure 3B:
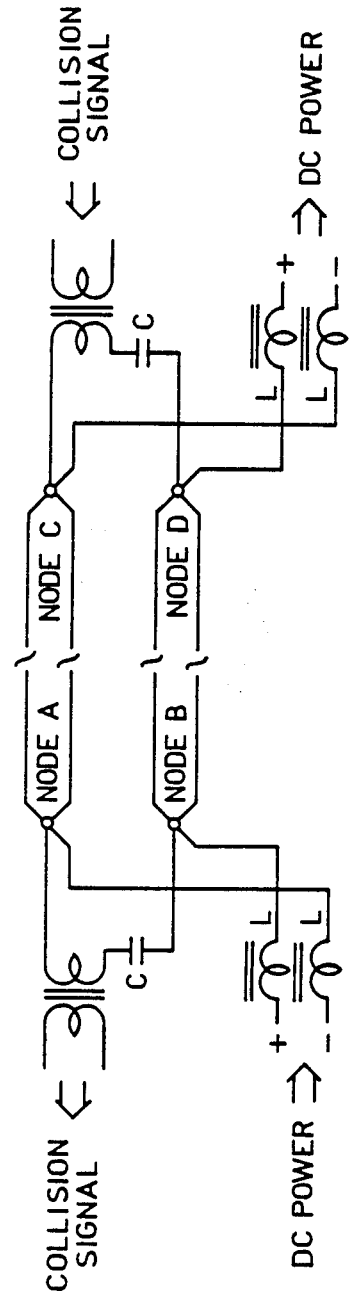

The phantom signal path is used to convey DC power from the host system to the transceiver module and collision signals from the transceiver to the host. FIG. 3A shows the elements of the phantom circuit. With equal line impedances and equal/opposing inductances, the equivalent circuit is shown in FIG. 3B. Capacitors present low impedance coupling of collision signals, but high impedance blockage for DC potentials. Inductors present low impedance passage of DC currents, but high impedance to 10 Mhz collision signals.

Thus FIG. 2 can be seen to include transformer 38 for transferring collision signals from transceiver circuits to the phantom circuit through capacitor 52. Likewise, capacitor 50 couples collision signals to transformer 32 which supplies signals to the host. DC power from the host (42) is transferred through inductors 44 to the phantom path. Likewise, DC power is transferred from the phantom path, through inductors 46, to the transceiver's DC/DC converter 48.

Instead of each twisted pair shield having its own ground terminal, the overall shield is connected through the connector housing and through one pin to chassis ground. With the savings in terminals, a smaller plug and jack connector can be used. Connection of the new drop cable is through 9 pin sub-miniature "D" connectors, male to host and female to transceiver.

Figure 4A:
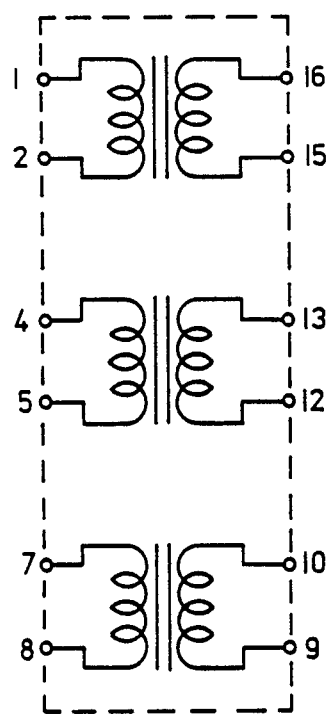
FIGS. 4A and 4B are schematic diagrams of dual in-line package isolation transformer circuits.
Figure 4B:
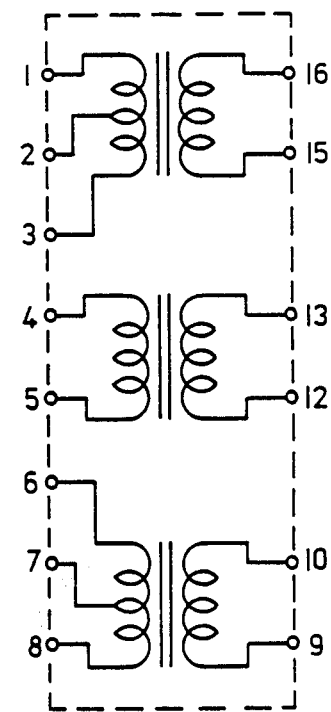

Several suppliers provide a triple transformer device for the transceiver in the IEEE 802.3 application. Such a triple transformer dual in line package is seen in FIG. 4A. These devices have the pin numbering configuration of the standard 16 pin dual in-line (DIP) package. A center tap triple transformer device as seen in FIG. 4B and connecting the taps to two available pins has been shown and tested in a modification of the standard triple transformer device as seen in FIG. 4A.

Some of the advantages of the new drop cable over that described in the IEEE specification, are smaller diameter, with a more flexible cable; smaller connectors with smaller foot prints; fewer connection contacts for improved reliability; anticipated greater electrostatic discharge protection; and a reduction in cost of the Ethernet connection. For example, the standard IEEE cable utilizing five twisted, individually shielded pairs with separate ground connection for each shield would cost about thirty five dollars. This cable is rather inflexible and resembles a large power cord instead of a serial communication cable. However, the cable of the present invention would cost approximately twelve to fifteen dollars. This is a substantial savings when thousands of machines are involved.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A multipoint data communication system for transmitting data to and from a plurality of communicating devices via an interconnecting cable, comprising
    transceiver means coupled to said interconnecting cable for coupling the interconnecting cable to a communication device and a communicating device to the interconnecting cable,
    drop cable means for coupling said transceiver means to said communicating device, and said communicating device to said transceiver means, said drop cable comprising two twisted pairs of wires with an overall shield, and
    circuit means at said communicating device for interfacing between said communicating device and said drop cable, wherein three distinct signals and power are conveyed over the two twisted wire pairs in said drop cable utilizing a phantom signal technique of signal transmission,
    wherein said transceiver means includes three transformer means for transmitting said three distinct signals, the outputs of one of said transformers being connected to the center taps of the other two transformers, such that a signal introduced by said one transformer is directed to and forwarded by the other two of said transformers, wherein said three distinct signals are alternating current signals while the fourth element is direct current power, and wherein said fourth element representing power is kept separate from said third signal via capacitor means between the output of the other transformer and the center tap of one of said two transformers in both said transceiver means and said circuit means.

2. A multipoint data communication system for transmitting data to and from a plurality of communicating devices via an interconnecting cable, comprising
    transceiver means coupled to said interconnecting cable for coupling the interconnecting cable to a communication device and a communicating device to the interconnecting cable,
    drop cable means for coupling said transceiver means to said communicating device, and said communicating device to said transceiver means, said drop cable comprising two twisted pairs of wires with an overall shield, and
    circuit means at said communicating device for interfacing between said communicating device and said drop cable, wherein three distinct signals and power are conveyed over the two twisted wire pairs in said drop cable utilizing a phantom signal technique of signal transmission,
    wherein said transceiver means includes three transformer means for transmitting said three distinct signals, the outputs of one of said transformers being connected to the center taps of the other two transformers, such that a signal introduced by said one transformer is directed to and forwarded by the other two of said transformers, wherein said circuit means at said communicating device includes three transformer means connected together in the same manner as set forth in said transceiver means such that the outputs of one of said transformer means in said circuit means is connected to the center taps of the other two transformers such that a signal received at the center taps of said other two transformers is directed to other transformers to generate said third signal at said other transformers, said third signal being a phantom signal, wherein said three distinct signals are alternating current signals while the fourth element is direct current power, wherein said fourth element representing power is kept separate from said third or phantom signal signal via capacitor means between the output of the other transformer and the center tap of one of said two transformers in both said transceiver means and said circuit means.

* * * * *